No. 661,842. Patented Nov. 13, 1900.
H. W. BLAISDELL.
CONVEYER.
(Application filed Apr. 26, 1900.)
(No Model.)
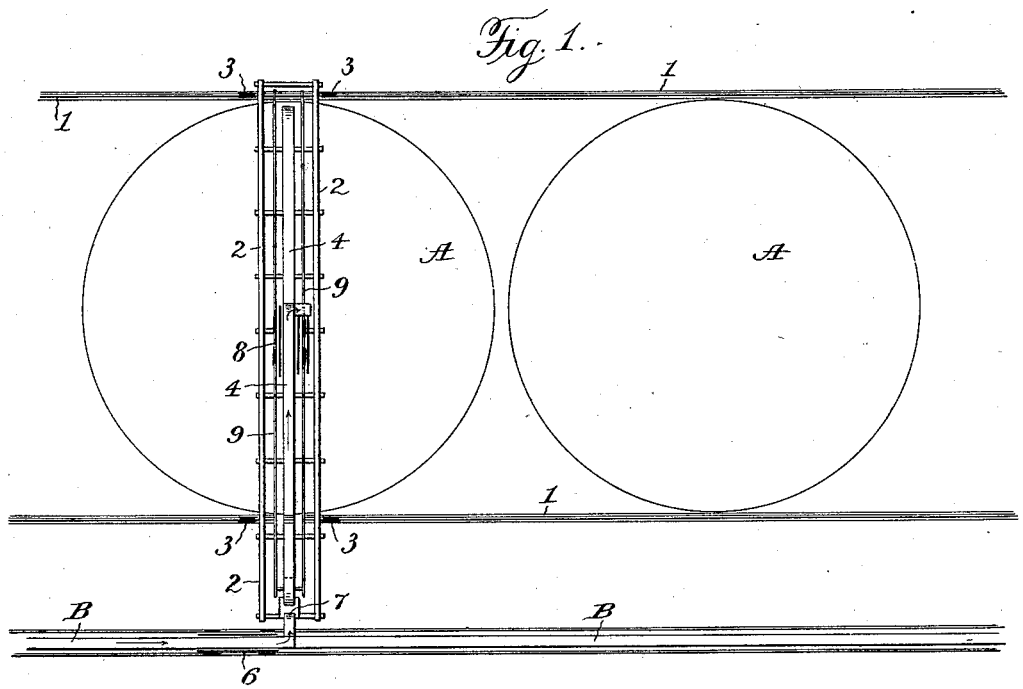
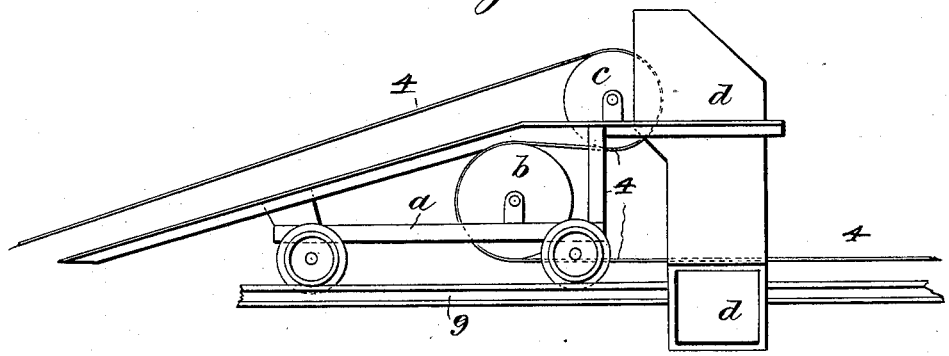
WITNESSES
Jas. E. Hutchinson
G. F. Downing
INVENTOR
H. W. Blaisdell
By N. A. Seymour
Attorney

UNITED STATES PATENT OFFICE.

HIRAM W. BLAISDELL, OF YUMA, ARIZONA TERRITORY.

CONVEYER.

SPECIFICATION forming part of Letters Patent No. 661,842, dated November 13, 1900.

Application filed April 26, 1900. Serial No. 14,483. (No model.)

*To all whom it may concern:*

Be it known that I, HIRAM W. BLAISDELL, a resident of Yuma, in the county of Yuma and Territory of Arizona, have invented certain new and useful Improvements in Conveyers; and I do hereby declare the following to be a full, clear, and exact description of the invention, such as will enable others skilled in the art to which it appertains to make and use the same.

My invention relates to an improvement in conveyers, one object of the invention being to provide a conveyer which will convey to and discharge material into any one of a series of bins or receptacles or any part of a single bin or receptacle.

A further object is to provide means for discharging material from one conveyer onto another disposed at an angle thereto and means on the latter conveyer for discharging at an angle thereto.

With these objects in view the invention consists in certain novel features of construction and combinations and arrangements of parts, as will be more fully hereinafter described, and pointed out in the claims.

In the accompanying drawings, Figure 1 is a plan view illustrating my improvements, and Fig. 2 is a detail view of one of the trippers.

A represents a series of bins or receptacles, on each side of which is disposed a rail 1, forming a track on which run wheeled trucks 3, supporting a traveling bridge 2, on which a traveling conveyer 4 is mounted, and a conveyer B is disposed parallel with and to one side of one of the rails 1 and adapted to convey material to the bridge conveyer. A rail 5 is provided on each side of the conveyer B, on which is mounted a wheeled adjustable dumping apparatus or tripper 6, constructed to discharge the material from the conveyer B at right angles thereto and into a hopper 7 on one end of the bridge 2, from which the material is carried by the conveyer 4 to another dumping apparatus or tripper 8, mounted on a track 9 on the bridge and adapted to discharge the material from the conveyer 4 at right angles thereto and into a bin or receptacle A.

The trippers 6 and 8 each comprise a truck $a$, having rollers $b$ and $c$ mounted thereon, the latter disposed above and in advance of the former, and the conveyer passes over the forward pulley $c$, thence around the opposite side of the roller $b$ and forward again and around a pulley, and back to the starting-point. The pulley $c$ is inclosed partially in a hopper $d$, disposed at right angles to the conveyer, so as to receive the material from the conveyer and discharge it at right angles.

It will be seen that material which is deposited onto the conveyer B will be carried thereby to the tripper 6 and be discharged onto the conveyer 4 and carried thereby to the tripper 8, which latter will discharge the material into a bin. The bridge can be moved along over the several bins or receptacles A, the dumper 6 being also moved so as to discharge onto conveyer 4 or into the hopper 7 and conveyed from the same by conveyer 4 to the tripper 8, which latter can be readily adjusted on the bridge to discharge the material into every corner and part of a bin.

My improvements are adapted to convey and deposit any material that can be handled on a traveling conveyer—such as sand, gravel, earth, stone, ore, grain, &c.—to any point in a line of bins, tanks, or storage-ground.

I do not limit myself to any particular form of conveyer, as any form may be employed to which an automatic dumper or tripper can be applied. Said tripper may run on tracks, as shown, or, if desired, there may be several automatic dumping apparatuses or trippers adapted to deposit onto the bridge conveyer, on which there is a second automatic dumper or tripper, by means of which the conveyed material can be deposited at any point along the line of the bridge conveyer, and by moving the bridge and dumper or tripper on main conveyer the material can be deposited in any and every part of the bin or receptacle. If desired, the dumper or tripper on the bridge may be constructed to move automatically along the same to discharge the material evenly throughout the bin.

Various slight changes might be resorted to in the general form and arrangement of the several parts described without departing from the spirit and scope of my invention, and hence I would have it understood that I do not wish to limit myself to the precise details set forth, but consider myself at liberty to make such slight changes and alterations as fairly fall within the spirit and scope of my invention.

Having fully described my invention, what I claim as new, and desire to secure by Letters Patent, is—

1. The combination of two conveyers disposed at an angle to each other and one adjustable relatively to the other and an adjustable discharging device coöperating with each conveyer, said discharging devices coöperating to discharge material at any point throughout the extent of the two conveyers.

2. The combination of a conveyer, a stationary support therefor, a movable bridge disposed at an angle to said conveyer and its stationary support, a conveyer on said movable bridge, a discharging device adjustable on the fixed support and coöperating with the conveyer thereon, and a discharging device on the movable bridge adjustable from end to end thereof and coöperating with the conveyer on the bridge to discharge material at any point throughout the length of the latter.

3. The combination with a fixed trackway and a conveyer thereon, of a traveling bridge disposed at right angles to said trackway, an endless conveyer extending lengthwise of said traveling bridge adapted to receive material from the first-mentioned conveyer at any point along the fixed trackway and an adjustable tripper on the bridge and coöperating with the conveyer thereon to discharge material from the bridge conveyer at any point between the ends of the bridge.

4. The combination with a series of bins or receptacles and a rail at each side thereof forming a track, of a movable bridge mounted to run on said track and disposed over the bins or receptacles, an endless conveyer on the movable bridge, a stationary support disposed beside the series of bins or receptacles and at right angles to the movable bridge, a conveyer on the stationary support, an adjustable tripper adapted to discharge from the conveyer on the stationary support onto the conveyer on the bridge and an adjustable tripper on the bridge coöperating with the endless conveyer thereon to discharge material from said endless conveyer on the bridge into any part of any of the bins or receptacles.

5. The combination of a conveyer mounted on a stationary support, a traveling bridge disposed at an angle thereto, an endless conveyer on the bridge, means coöperating with the first-mentioned conveyer for discharging onto the conveyer on the traveling bridge and adjustable means coöperating with the conveyer on the bridge for discharging at an angle thereto.

In testimony whereof I have signed this specification in the presence of two subscribing witnesses.

HIRAM W. BLAISDELL.

Witnesses:
W. T. HEFFERNAN,
F. G. BLAISDELL.